United States Patent [19]

Renner et al.

[11] 4,381,339

[45] Apr. 26, 1983

[54] PHOTOGRAPHIC RECORDING MATERIAL AND NON-DIFFUSING COMPOUNDS TO BE USED IN THE MATERIAL WHICH CONTAINS A PHOTOGRAPHICALLY ACTIVE GROUP WHICH CAN BE SPLIT OFF

[75] Inventors: Günter Renner, Cologne; Erich Wolff, Leverkusen, both of Fed. Rep. of Germany

[73] Assignee: Agfa-Gevaert Aktiengesellschaft, Leverkusen, Fed. Rep. of Germany

[21] Appl. No.: 252,572

[22] Filed: Apr. 9, 1981

[30] Foreign Application Priority Data

Apr. 16, 1980 [DE] Fed. Rep. of Germany ....... 3014669

[51] Int. Cl.³ ............................................. G03C 5/00
[52] U.S. Cl. ............................... 430/223; 430/220; 430/242; 430/559; 430/958
[58] Field of Search .............. 430/223, 218, 222, 242, 430/559, 564, 955, 958, 220

[56] References Cited

U.S. PATENT DOCUMENTS

| | | | |
|---|---|---|---|
| 3,980,479 | 9/1976 | Fields et al. | 430/222 |
| 4,139,379 | 2/1979 | Chasman et al. | 430/223 |
| 4,139,389 | 2/1979 | Hinshaw et al. | 430/223 |
| 4,232,107 | 11/1980 | Janssens | 430/223 |

*Primary Examiner*—J. Travis Brown
*Attorney, Agent, or Firm*—Connolly and Hutz

[57] ABSTRACT

Novel non-diffusing reducible compounds of formula I which under alkaline development conditions release a diffusible photographically useful compound are of use in color diffusion transfer processes.

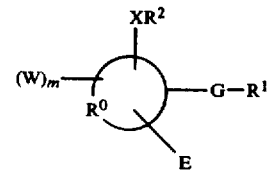

$R^0$ completes a ring system;
E represents a reducible group;
W reduces the electron density in the position of E so that E is reducible under photographic development conditions;
$GR^1$ represents a group from which photographically useful compound $R^1$ is released;
$XR^2$ represents a group that by reduction of E is activated to cooperate with $GR^1$ in an intramolecular reaction with release of $R^1$.

7 Claims, No Drawings

PHOTOGRAPHIC RECORDING MATERIAL AND NON-DIFFUSING COMPOUNDS TO BE USED IN THE MATERIAL WHICH CONTAINS A PHOTOGRAPHICALLY ACTIVE GROUP WHICH CAN BE SPLIT OFF

This invention relates to a photographic recording material for the production of photographic images by use of diffusion transfer processes, and new compounds capable of releasing a photographically active group. The photographically active group may be a dye or dye precursor.

Among the known processes for the production of colored photographic images by the dye diffusion transfer process, those based on the use of color providing compounds which are incorporated in a non-diffusing form and from which diffusible dyes or dye precursors are split off imagewise by development and transferred to an image receiving layer have in recent times gained increasingly in importance.

Among the color providing compounds suitable for this purpose may be included, for example the non-diffusing color couplers described in German Patent No. 1,095,115. When development takes place, a dye, which may be either preformed or produced during color coupling, is released from these color couplers in diffusible form as the result of a reaction with the oxidation product of a color developer compound consisting of a primary aromatic amine. The choice of developer compound used for these couplers is, of course, restricted to color developers.

Also to be mentioned in this context are the non-diffusing color providing compounds described in German Offenlegungsschrift No. 1,930,215, in which a preformed dye residue which is latently diffusible is linked to a group which confers diffusion resistance through a hydrazone group which can be split. These compounds should not be regarded as color couplers and it has been found that the choice of developer compound required to release the diffusible dye residue is by no means restricted to the usual color developers but may also include black and white developers such as, for example, pyrocatechols.

In German Offenlegungsschrift No. 1,772,929 there have also been described non-diffusing colored compounds which contain a special group and enter into an oxidative ring closure reaction in development to release a preformed dye residue in a diffusible form. The compounds mentioned there may be divided into two groups. Compounds of the one group require a conventional color developer compound for development. They couple with the oxidation product of this compound and, in a subsequent ring closure reaction, they release the pre-formed dye residue in diffusible form. Compounds of the other group are themselves silver halide decelopers and are therefore capable, in their oxidized form, of entering into the above mentioned ring closure reaction to release the diffusible dyes even in the absence of other developer compounds.

Lastly, there should be mentioned the non-diffusible color providing compounds according to German Offenlegungsschrift No. 2,242,762. These are sulfonamido phenols and sulfonamide anilines which are split under the influence of the developer alkali after the oxidation reaction of development has taken place, to release diffusible dyes containing a free sulfamoyl group.

The above mentioned color providing compounds are without exception negative in their reactions, i.e. the imagewise distribution of the diffusible dyes released corresponds to the negative silver image produced by development when conventional (negatively functioning) silver halide emulsions are used. The production of positive dye images therefore requires the use of direct positive silver halide emulsions or a suitable reversal process.

Non-diffusing oxidizable color providing compounds which in their reduced state are capable of undergoing a splitting reaction under alkaline development conditions to release a diffusible dye but in which the splitting reaction is difficult or impossible when they are in their oxidized state have also been disclosed in German Offenlegungsschriften Nos. 2,402,900; 2,543,902 and 2,823,159; U.S. Pat. Nos. 3,980,479 and 4,108,850 and British Patent Nos. 1,464,105 and 1,464,104. Such compounds are suitable for use in combination with conventional negative emulsions to produce positive transfer color images.

It is of advantage, when such compounds can be used in the form of their oxidized precursors which are stable under alkaline conditions instead of using them in their reduced state in which they are unstable to alkali. Such reducible compounds are described in U.S. Pat. Nos. 4,139,379 and 4,139,389. They contain an electron-accepting nucleophilic precursor group which has to be reduced before it can react in an intramolecular nucleophilic displacement reaction with another group to release therefrom a photographic reagent. In the published European patent application No. 4399 there are described reducible compounds which after reduction are involved in an intramolecular elimination reaction to release a photographically useful group.

A new class of non-diffusing compounds has now been found which, in their reduced state, are subject to a splitting reaction under the influence of developer alkali to release a photographically active group, in particular a diffusible dye, but which are not subject to this splitting reaction or only to a much less extent, when they are not in the reduced state.

The compounds of the present invention contain a first group that can be reduced under photographic development conditions, and a second group which is in an inactive state but can, by reduction of the first group, be brought into an active state in which it can react intramolecularly with a third group to release therefrom a diffusible photographically active compound.

It is an object of the present invention to provide a photographic recording material comprising at least one light-sensitive silver halide emulsion layer and a non-diffusing compound associated therewith, which compound is subject to a splitting reaction under alkaline development conditions when it is in its reduced form to release a photographically active compound, e.g. a diffusible dye, and which in its unreduced state is not subject to this splitting reaction, or to only a much less extent. If the photographically active compound is a diffusible dye, it may be transferred to an image receiving layer. In such a case, the non-diffusing compounds will hereinafter be referred to as color providing compounds.

The compounds according to the invention correspond to the following formula I:

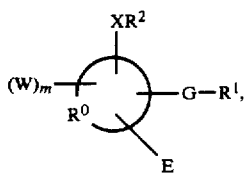

in which the substituents W, $XR^2$, $G-R^1$ and E may be arranged in any positions relative to each other and in which:

$R^0$ represents the atoms required to complete a ring system comprising at least one aromatic or hetero aromatic ring which may have other rings substituted to it or condensed to it such as a phenyl substituent or a condensed benzene ring;

W represents a group which reduces the electron density in the ring at the site of the substituent E;

m represents an integer or from 1 to 3;

G represents a group in which $R^1$ may be split off under photographic development conditions;

$R^1$ represents the residue of a photographically active compound;

X represents an oxygen atom, a sulfur atom or an imino group:

$R^2$ represents hydrogen or preferably a group capable of being split off in an alkaline medium; and E represents a reducible group;

and compound I also contain other substituents commonly used for photographic purposes such as e.g. groups conferring diffusion resistance.

In a preferred embodiment, the various groups in formula I have the following meaning:

$R^0$ represents the atoms required to complete a substituted or unsubstituted 5-membered or 6-membered aromatic or hetero aromatic ring which may have other rings condensed to it;

W represents a halogen atom such as fluoro, chloro, bromo and iodo or a cyano, nitro, nitroso, trifluoromethyl, quaternary ammonium or acyl group;

m represents an integer of from 1 to 3;

$R^2$ represents hydrogen or preferably an acyl group;

X represents an oxygen atom, a sulfur atom or the group-$NR^3$-;

E represents one of the following groups:

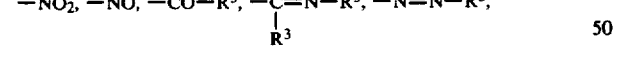

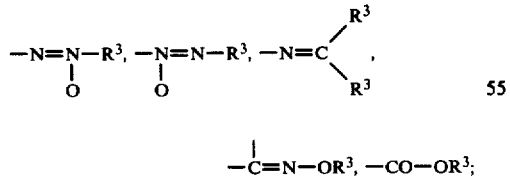

$R^3$ represents hydrogen, alkyl, in particular with 1 to 18 carbon atoms, aryl, in particular phenyl, a heterocyclic group, in particular one containing nitrogen and preferably having 5 or 6 members, or an aralkyl group, in particular benzyl, and these groups may be substituted with the usual substituents, e.g. hydroxyl; more than one group $R^3$ occurring in the same compound may have the same or different meanings within the definition set forth above.

In a preferred embodiment of the invention, the group $G-R^1$ in formula I has one of the following meanings a, b and c:

(a) the group $CR^{11}R^{12}-R^1$, wherein $R^{11}$ represents a substituted or unsubstituted hydrocarbon group, e.g. an alkyl group with up to 18 carbon atoms, such as methyl, ethyl, n-hexyl, n-octyl, n-undecyl, n-dodecyl, n-tridecyl or n-heptadecyl, aralkyl such as benzyl or aryl such as phenyl;

$R^{12}$ represents hydrogen or a substituted or unsubstituted hydrocarbon group, e.g. an alkyl group with up to 18 carbon atoms such as methyl, ethyl, n-hexyl, n-octyl, n-undecyl, n-dodecyl, n-tridecyl and n-heptadecyl, an aralkyl such as benzyl or an aryl group such as phenyl;

$R^1$ represents the group $Z^1-(Y)_n-A$, wherein $Z^1$ represents $-SO_2-$ or $-S-$;

A represents the radical of photographically active compound and

Y represents a bivalent linking member of the formula $-R^{13}-(L)_p-(R^{14})_q-$, in which $R^{13}$ and $R^{14}$ represent an alkyl group with 1 to 6 carbon atoms or a substituted or unsubstituted arylene or aralkylene group, and the two groups, $R^{13}$ and $R^{14}$, may have the same or a different meaning:

L represents $-O-$, $-CO-$, $-CONR^{15}-$, $-SO_2-NR^{15}-$, $-O-CO-NR^{15}-$, $-S-$, $-SO-$ or $-SO_2-$ ($R^{15}$ = hydrogen or alkyl);

p represents 0 or 1;

q represents 0 or 1 and n represents 0 or 1.

(b) the group $NR^4-CO-R^1$ in which $R^4$ has the meaning indicated under $R^{12}$ and $R^1$ represents $Z^2-(Y)_n-A$, $Z^2$ represents an oxygen atom, a sulfur atom or the group $-NR^{16}-$;

$R^{16}$ represents a hydrogen atom or an alkyl group, in particular one having from 1 to 18 carbon atoms, and Y, n and A have the meaning indicated under (a).

(c) the group

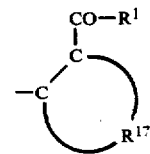

which preferably is located in the vicinity of the group $-XR^2$, e.g. in a position ortho or peri to $-XR^2$ and in which $R^{17}$ represents the atoms required to complete a substituted or unsubstituted aromatic or hetero aromatic ring which may have other rings condensed to it, in particular a group for completing an aromatic carbocyclic ring having from 6 to 10 carbon atoms, especially phenyl or naphthyl, and $R^1$ has the meaning indicated under (b).

In a particular preferred embodiment, $R^0$ represents the atoms required to complete a carbocyclic ring system, for example a benzene ring or a naphthalene ring;

W represents $-SO_2R$, $-NO_2$, $-N=O$, $-CO-R$ or $-SO_2-NR_2$, in which R represents hydrogen, alkyl or aryl;

X represents an oxygen atom;

$R^2$ represents a benzoyl group or an aliphatic acyl group having from 1 to 18 carbon atoms or an alkoxy carbonyl or aroxy carbonyl group having from 1 to 18 carbon atoms; and E represents $-NO_2$ or $-N=O$.

The substituent E is preferably arranged so that by its reduction the group $-XR^2$ is sufficiently activated to initiate the release of the group $R^1$. When, for example, $R^0$ completes a 6-member ring E is preferably located in a position ortho or para to $-XR^2$. $R^2$ being an acyl group may initially difficulty be hydrolysed as long as E remains in its non-reduced state. On reduction of E the velocity of decylation in the group $-XR^2$ is largely increased at least when E is in position ortho to $-XR^2$.

The substituent W is preferably arranged so that it reduces the electron density in the position of the substituent E. When, for example, $R^0$ represents the group required to complete a 5-membered or 6-membered ring, W is preferably in a position ortho or para to E.

The group A is the radical of a photographically active compound. Photographically active compounds include, for example, dyes, dye precursors, couplers such as DIR couplers, masking couplers or white couplers, stabilizers, development inhibitors and bleaching accelerators.

Since the compounds according to the invention are particularly suitable for the production of photographic color images, it is preferred to use compounds in which A is a dye forming residue. In that case, A may be the radical of a completely preformed dye or a dye precursor.

The dye residues of all classes of dyes may be used as residues A provided that they are sufficiently diffusible to be able to diffuse to the image receiving layer through the layers of light-sensitive material. The dye residues may be equipped with one or more water solubilizing groups for this purpose. Suitable water solubilizing groups include, inter alia, carboxyl groups, sulfo groups, sulfonamide groups and aliphatic and aromatic hydroxyl groups. The sulfinic acid groups which may remain in the dye after the splitting reaction in some cases, e.g. when $Z^1$ represents $SO_2$, is itself capable of imparting to the dye molecule a considerable tendency to diffusion in alkaline media so that in such cases the presence of additional water solubilizing groups is not absolutely necessary. The following are examples of dyes which are particularly suitable for the process according to the invention: Azo dyes, azomethine dyes, anthraquinone dyes, phthalocyanine dyes, indigoid dyes, triphenyl methane dyes, including such dyes which are in the form of metal complexes or which may form such complexes when contacted with metal ions.

Suitable dye residues have been described in detail, in particular in German Offenlegungsschriften Nos. 2,242,762 and 2,505,248 and in Research Disclosure Publication No. 15, 654 (April 77). Reference may also be made to German Offenlegungsschriften Nos. 2,626,821 and 2,756,656 for yellow image dyes, 2,406,626; 2,406,627 and 2,503,443 for magenta dyes and 2,406,653; 2,462,010 and 2,607,440 for cyan image dyes.

Suitable metallizable or metallized dyes for use as photographically active groups for the CR compounds to be used according to the invention have been described in U.S. Pat. Nos. 4,165,238; 4,165,987; 4,183,754 and 4,183,755.

Residues of dye precursors also include residues of compounds which are converted into dyes by the usual or by additional processing steps during photographic processing, either by oxidation or by coupling or by unblocking of an auxochromic group in a chromophoric system, for example by saponification. Dye precursor products in that sense include leuko dyes, couplers and dyes which are converted into other dyes in the course of processing, e.g. so-called "shifted dyes".

By so-called "shifted dyes" are meant dyes in which the spectral absorption is shifted hypsochromically or bathochromically when a change in the medium takes place, e.g. a change in the pH, or when the dyes are altered chemically, e.g. by the formation of metal complexes or the removal of a substituent from the chromophoric system of the dye, as described in U.S. Pat. No. 3,260,597. The reason why "shifted dyes" are advantageous is that their absorption ranges may be initially outside the range of light-sensitivity of the associated silver halide emulsions, so that no reduction in light-sensitivity is possible. It is only during processing, e.g. in the image receiving layer, that these dyes are converted by the various possible factors mentioned above into dyes which absorb in the desired absorption range of the image dyes.

The bivalent connecting link Y which may control the rate of diffusion of the residue A and influence the speed at which splitting proceeds may in particular correspond to the following formulae:

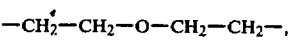

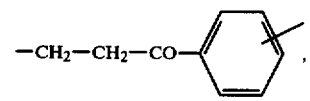

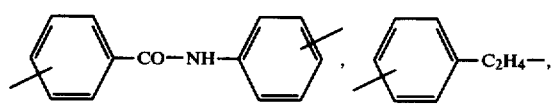

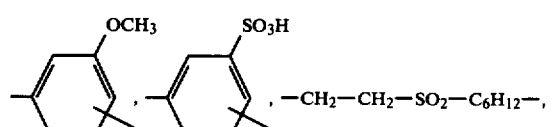

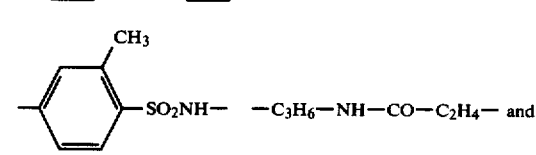

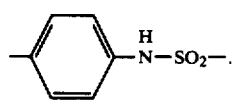

It should be noted that as intact molecules, the color providing compounds according to the invention should not diffuse in the layers of the photographic material. They contain for this purpose a group which renders them diffusion fast. This group may be situated, for example, in one of the above mentioned substituents or in an attached condensed ring.

The color providing compounds may have sufficient resistance to diffusion even if the foresaid substitents do not have relatively long alkyl groups because even then the molecule may be sufficiently large, depending on the size of the dye residue. In other cases, the color providing compounds may be rendered diffusion fast by means of sufficiently large residues.

Residues are to be regarded as conferring resistance to diffusion if they make it possible for the compounds according to the invention to be incorporated in a diffusion fast form in the hydrophilic colloids normally used in photographic materials. Organic residues, generally containing straight or branched chain aliphatic groups generally having from 8 to b 20 carbon atoms and optionally also carbocyclic or heterocyclic, optionally aromatic groups, are particularly suitable for this purpose. These residues may be connected either directly or indirectly to the remainder of the molecule, e.g. through one of the following groups; —NHCO—, —NHSO$_2$—, —NR— in which R represents hydrogen or alkyl; —O—, —S— or —SO$_2$—. The residue which confers diffusion resistance may, in addition, contain groups which confer solubility in water, e.g. sulfo groups or carboxyl groups, and these may also be present in an anionic form. Since the diffusion properties depend on the molecular size of the compound as a whole, it is sufficient in some cases, e.g. if the molecule as a whole is large enough, to use only short chain residues to confer diffusion resistance.

The following compounds having the structures II to IV have proved to be particularly suitable compounds corresponding to the general formula I:

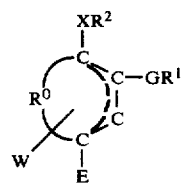

II

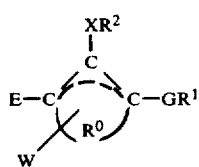

III

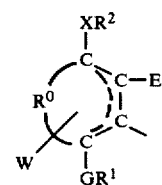

IV

In formulae II to IV, $R^0$ represents the atoms required to complete a 6-membered aromatic ring which may have other rings condensed to it. Benzene and naphthalene rings are particularly preferred examples thereof.

In a still more preferred embodiment the non-diffusing reducible compounds of the present invention correspond to the following formula V

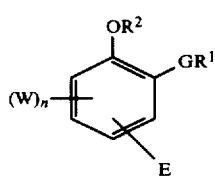

V in which

GR$^1$ represents —CR$^{11}$R$^{12}$—SO$_2$—A or —NR$^{12}$—CO—O—A

R$^{11}$ represents alkyl containing up to 18 carbon atoms

R$^{12}$ represents hydrogen or alkyl containing up to 18 carbon atoms

A represents the residue of a diffusible dye

R$^2$ represents an acyl residue derived from a carboxylic acid or from a carbonic acid mono ester E represents a nitro group in position ortho or para to —OR$^2$ W represents an alkyl sulfonyl group in position ortho or para to E n represents 1 or 2.

The following are preferred compounds corresponding to the general formula (I):

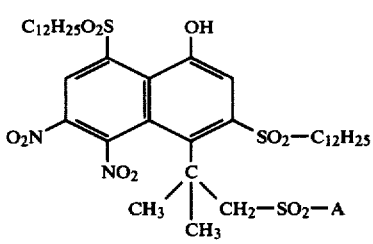

1.1

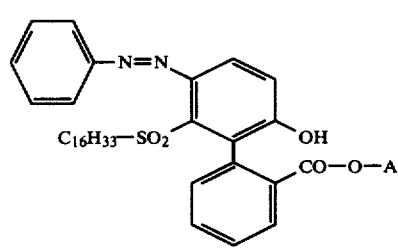

1.2

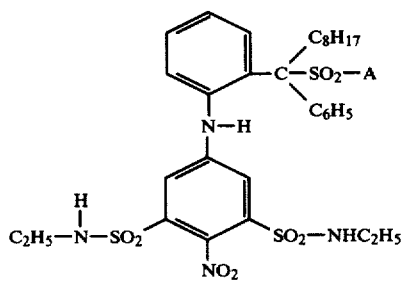

1.3

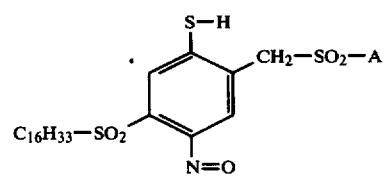

1.4

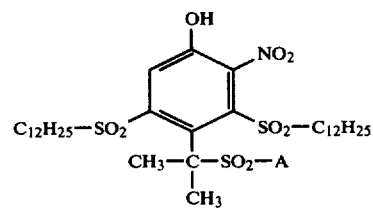

1.5

-continued
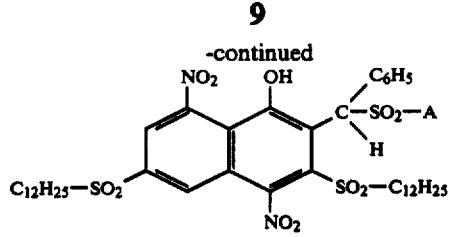 1.6
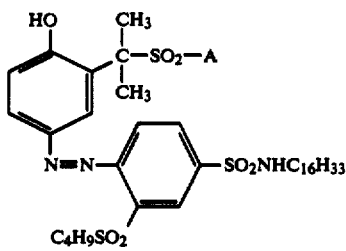 1.7
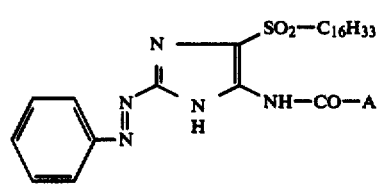 1.8
-continued
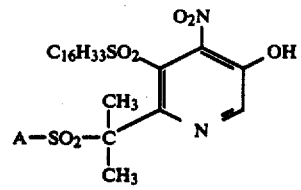 1.9
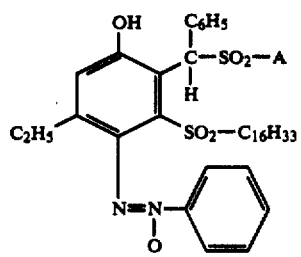 1.10
The following compounds are particularly preferred:
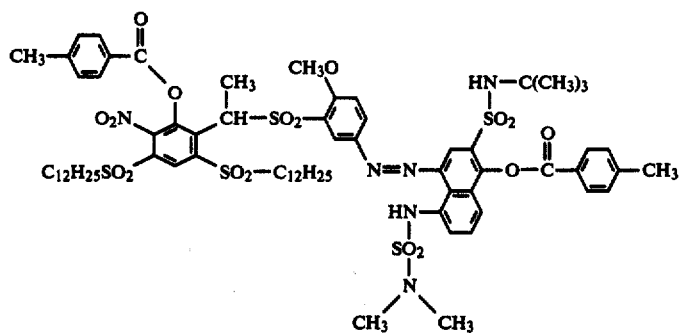 2.1
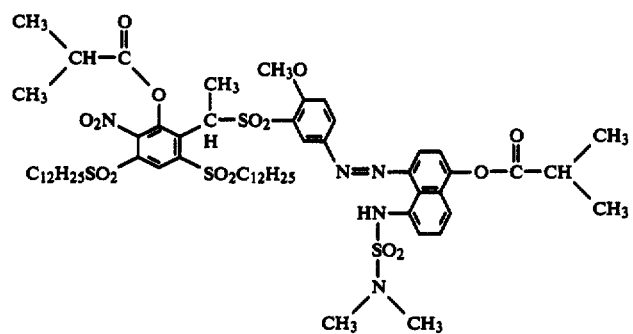 2.2
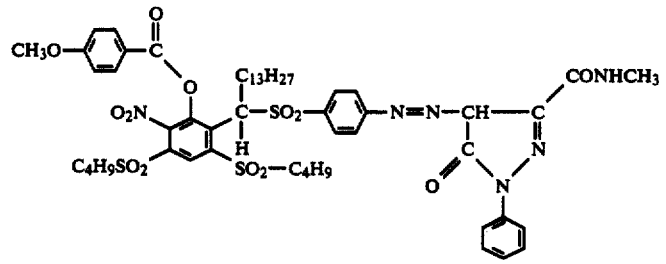 2.3

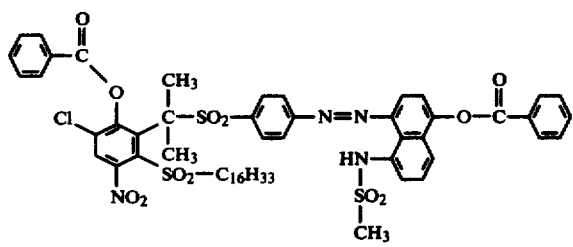
2.4
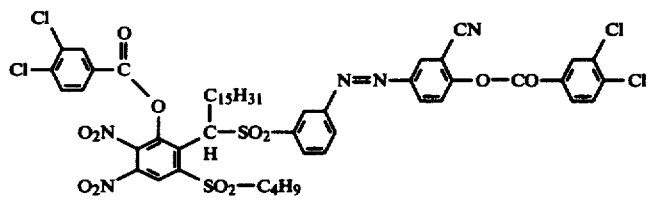
2.5
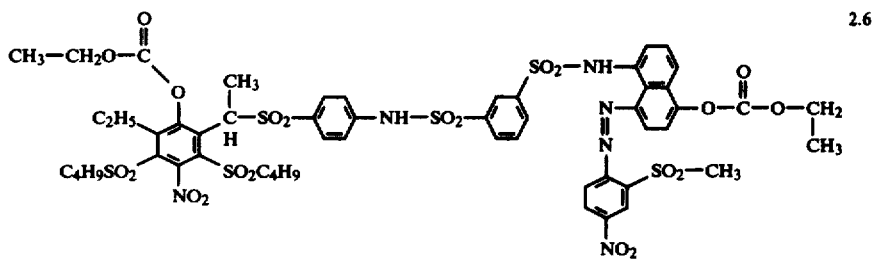
2.6
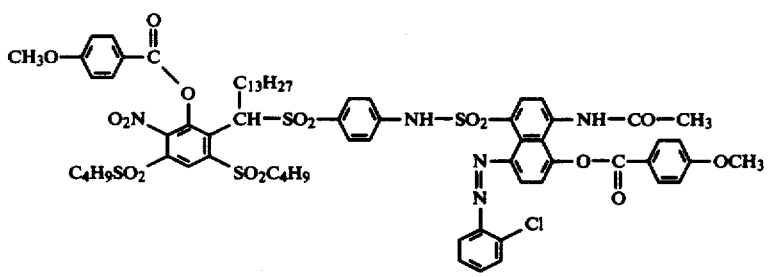
2.7
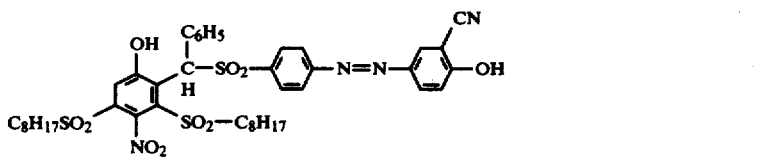
2.8
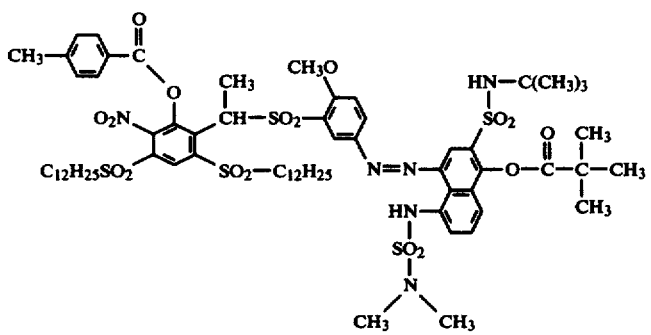
2.9

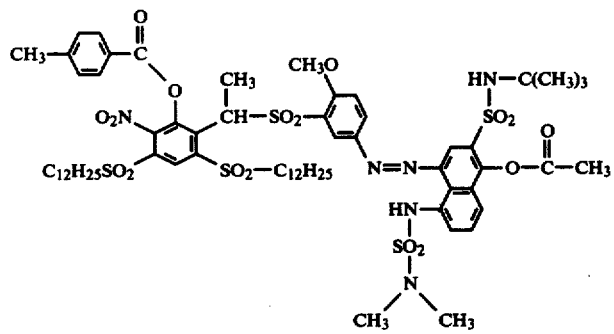
2.10
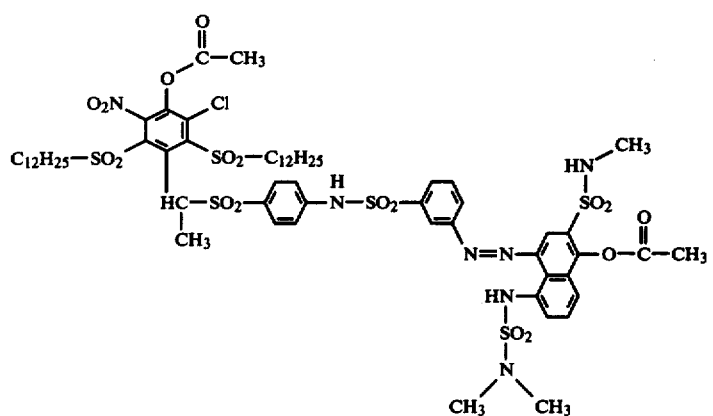
2.11
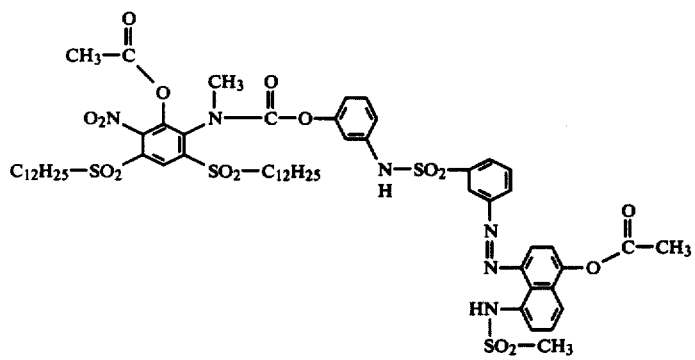
2.12
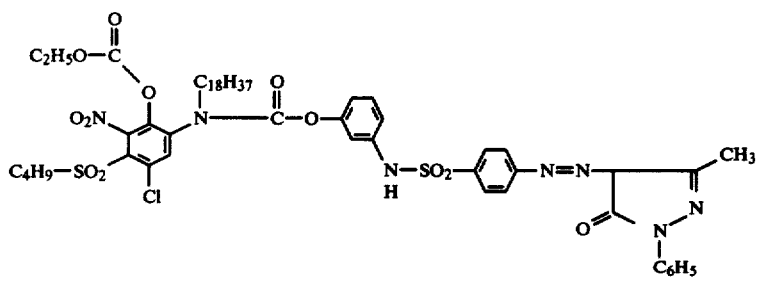
2.13

2.14

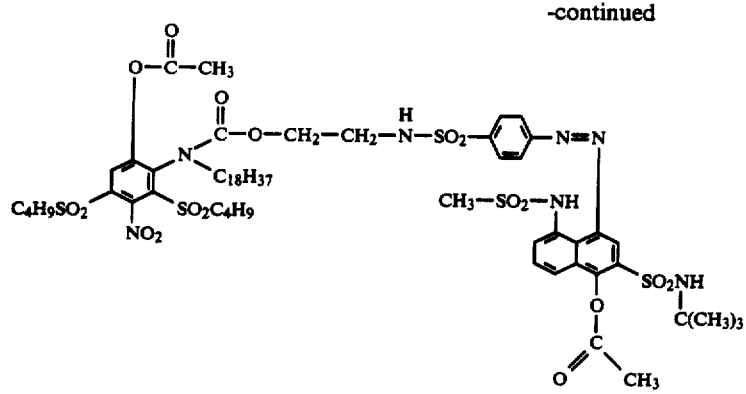

2.15

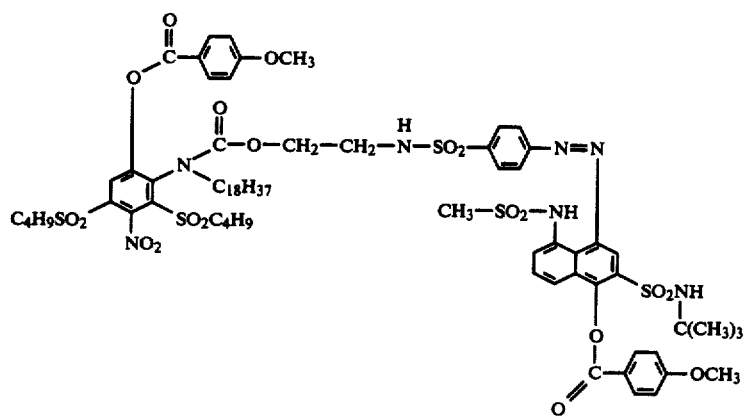

The compounds of formula I may be obtained by known processes, starting from chlorophenols which may be worked up in acordance with the following reaction scheme:

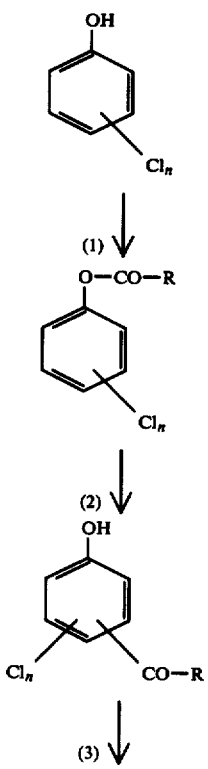

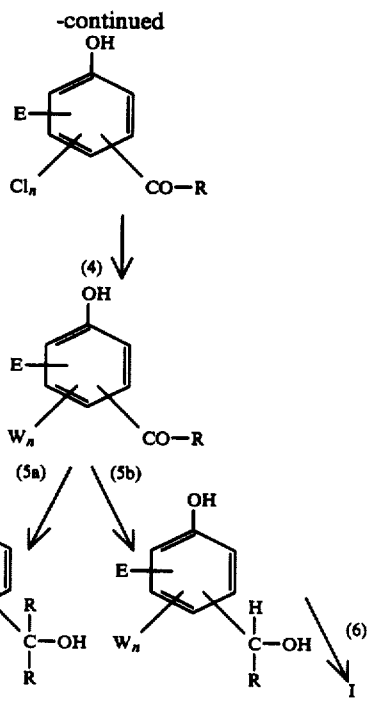

The chlorophenols used as starting materials are known from the literature. Acylation (1) of these compounds is carried out by the usual methods, using an acid acceptor in aprotic solvents. The acyl group introduced may be shifted by a Fries reaction (2), as described in Organic Reactions, 1 (1942), 342–369. Introduction of the substituent E (3) generally proceeds readily from the activated aromatic compounds, as described e.g. in Houben-Weyl, Volume X/1, page 606; or M. Krause: Berichte der Deutschen Chemischen Gesellschaft 32 (1899), 124. Introduction of the substituent W (4) takes place by exchange of the halogen atom, e.g by a mercaptan and oxidation of the resulting thioether with hydrogen peroxide.

The reaction (5a) is known from Organikum, 1967, page 488, and the reaction (5b) from JACS 73 (1951), 2857 and JACS 74 (1952), 3668. The final reaction step (6) for obtaining the compounds according to the invention is known from Hinsberg, Ber. 50 (1917), 468 and Balfe, J.Chem.Soc. (1950), 3390, as is also the acylation reaction which is in some cases advantageous.

The following methods of preparation are described by way of example:

Preparation of compound 2.1;

2.1.a: 81.5 g of 3,5-dichlorophenol were dissolved in 250 ml of pyridine and reacted with 48 g of acetyl chloride at room temperature. The reaction mixture was poured on ice/hydrochloric acid, suction-filtered and washed. 1-acetoxy-3,5-dichlorobenzene was redissolved from methanol. Mp: 36° C.

2.1.b: 50 g of 1-acetoxy-3,5-dichlorobenzene were heated to 120° C. 45 g of aluminium chloride were added portionwise. After 2 hours, the reaction mixture was hydrolysed with ice and a little hydrochloride acid, 2-acetyl-3,5-dichlorophenol was taken up in methylene chloride and separated off. The solution was concentrated by evaporation and the residue was distilled with steam. The product could be redissolved from petroleum ether. Mp: 48°–49° C.

2.1.c: 20.5 g of 2-acetyl-3,5-dichlorophenol were dissolved in 150 ml of concentrated $H_2SO_4$ at $-10°$ to $0°$ C., and 11 g of potassium nitrate were slowly added with cooling. The reaction mixture was then left to adjust to room temperature and precipitated in ice water. The product was suction filtered. Mp: 62°–64° C.

2.1.d: 25 g of 2-acetyl-3,5-dichloro-6-nitrophenol were dissolved in 75 ml of dimethyl sulfoxide. This solution was added to 60 g of dodecyl mercaptan, 10 g of sodium hydride (80%) and 250 ml of dimethyl sulfoxide. The reaction mixture was stirred for 3 hours at 60° to 70° C. and then stirred into water. The organic phase ws taken up with methylene chloride and the solvent was evaporated off. The residue was purified with petroleum ether. Mp: 75°–77° C.

2.1.e: 30 g of the bisthioether obtained as under (d) were dissolved in 250 ml of glacial acetic acid and oxidized with 30 ml of 30% hydrogen peroxide within 3 hours. The product precipitated on cooling and was washed with glacial acetic acid. Mp: 135°–136° C.

2.1.f: 32.5 g of the disulfone obtained under (e) in 2,000 ml of isopropanol and 40 ml of 10% potash solution were brought together with 15 g of sodium borohydride in 40 ml of water at 20° to 25° C. The reaction mixture was stirred at room temperature for 30 hours. It was then acidified with acetic acid, and ethyl acetate was added. The ethyl acetate phase was washed, dried and evaporated. A white product (Mp: 169°–171° C.) was obtained.

2.1.g: 13 g of the carbinol obtained under (f) and 12 g of 2-(tertiary butyl sulfamido)-5-dimethylaminosulfamoyl-4-(4'-methoxy-3'-sulfino)phenylazo-naphthol-1 were dissolved in 200 ml of dimethyl acetamide at 20° C. 8 g of dicyclohexyl carbodiimide dissolved in 40 ml of dimethyl acetamide were added at 20° C. The reaction mixture was then stirred for 3 hours and suction filtered. The mother liquor was precipitated in a slightly acid mixture of ice and water. The dye was taken up in ethyl acetate, wshed, dried and evaporated. The residue ws purified with petroleum ether.

The compound no longer had a sharp melting point but a sample thereof decomposed at 220°–230° C.

2.1.h: 12.3 g of the red dye obtained under (g) was dissolved in acetone with a little pyridine. 6 g of 4-methyl-benzoic acid chloride were added at room temperature. The reaction mixture was then stirred for 1 hour and worked up in an aqueous medium.

The doubly acylated yellow product is obtained with a high degree of purity.

Preparation of compound 2.2:

4.1 g of the red dye described under compound 2.1, paragraph (g) were dissolved in 40 ml of dimethyl acetamide. 2.44 g of chloroformic acid isopropyl ester were added, 2 g of triethylamine were introduced dropwise, and the mixture was stirred for 30 minutes. It was then worked up and the organic phase was concentrated by evaporation. The residue was taken up with a small quantity of ethyl acetate and the yellow dye 2.2 was precipitated with petroleum ether.

Preparation of compound 2.3:

2.3.a: 81.5 of the dichlorophenol were dissolved in 200 ml of acetone and 200 ml of pyridine. 123 g of myristic acid chloride were added dropwise within 2 hours at 40° C. Stirring was then continued for 1 hour, the reaction mixture was poured on ice/hydrochloric acid and the precipitated product was suction filtered.

2.3.b: 20 g of aluminum chloride were slowly added to 30 g of substance 2.3.a at 140° C. The reaction mixture was stirred fro 3 hours and then worked up with ice and a little hydrochlorid acid. The product was taken up with methylene chloride and the organic phase was washed and dried. The solvent was distilled off. The remaining residue was redissolved from methanol.

2.3.c: 37 g of compound 2.3.b were nitrated with 11 g of potassium nitrate as described at 2.1.c. The product obtained had a yellowish color and a melting point of 95°–96° C.

2.3.d: 21 g of compound 2.3.c were dissolved in 200 ml of dimethyl sulfoxide. The solution obtained was slowly added dropwise to a stirred suspension of 13.5 g of butyl mercaptan and 4.5 g of 80% sodium hydride in 100 ml of dimethyl sulfoxide. The reaction mixture was stirred at 70° to 80° C. for 4 hours and then worked up in an aqueous medium. The solvent was evaporated off under vacuum. The purity of the residue was sufficient for the following oxidation.

2.3.e: 2.3.d was oxidized as described under 2.1.e. The disulfone obtained was redissolved from ethanol. Mp: 142°–144° C.

2.3.f: 12.4 g of disulfone 2.3.e and 4.5 g of aluminium isopropylate were brought together in 300 ml of isopropanol. The reaction mixture was heated and the acetone was distilled off within 5 hours. Ethyl acetate and dilute hydrochloric acid were added to the residue. The product was separated off and recrystallized from n-propanol.

2.3.g: 6.2 g of the carbinol 2.3.f and 2 g of 4-methoxy benzoic acid chloride were reacted with 1 g of pyridine in methyl ethyl ketone. The reaction mixture was poured on water and worked up with ethyl acetate. The resulting produce was sufficiently pure.

2.3.h: 7.9 g of the compound obtained under 2.3.g were dissolved in 150 ml of dioxane. 4.5 g of 1-phenyl-3-

N-methylcarbamoyl-4-(4'-sulfino)-phenylazo-pyrazolone-5 were added. The reaction mixture was stirred at 40° C. and a total of 2.5 g of dicyclohexyl carbodiimide was slowly added. After 90 minutes, the reaction mixture was suction filtered to remove the precipitated area. The mother liquor was stirred into water with a little acetic acid, and the aqueous phase was separated. After washing and drying, the reaction mixture was concentrated by evaporation. The residue was purified with methanol.

The compounds exemplified in the other formulae were synthesized by methods analogous to those described. The following reactions deviated from the general scheme:

Compound 2.4:

The method was analogous to that of 2.1.a but using 2,5-dichlorophenol instead of 3,5-dichlorophenol. The acetophenone obtained was converted into dimethyl phenyl carbinol by a Grignard reaction.

Compound 2.6:

2-ethyl-3,5-dichlorophenol was obtained by a Clemmensen reduction from 2.1.b. The compound was then again acylated and subjected to a Fries reaction.

The substituents shown in formula I may be situated in various positions but are preferably in positions in which they can readily form an organic ring or a comparatively short lived organic ring by an intramolecular reaction of the group $XR^2$ with G or in which $XR^2$ can enter into a 1,4- or 1,6-elimiation with the group $GR^1$. $R^2$ and $R^1$ are thus split off in a reaction which is accompanied by the formation of a new $\pi$ bond and shift of at least one $\pi$ electron pair already present. These reactions take place when the residue E has taken up at least one electron. The velocity of this reaction is very low or virtually zero before reduction of the group E.

The new compounds according to the invention are stable under processing and development conditions except when release of a compound is a direct function of the reduction of the group E. The compounds may also have other groups which ionize or hydrolyse. The primary imagewise release of the photographically active compound, however, occurs through the above mentioned reactions, and the group obtained by reduction of the group E influences the group $XR^2$ to such an extent that the reactions described for splitting off the photographically active compound are brought about. If the compounds of the present invention are used under comparatively strong alkaline conditions, the various substituents of the compounds are selected to ensure that the compounds are comparatively stable against external attack by alkali.

The compounds according to the invention have several advantages compared with comparable compounds known in the prior art. One important advantage of the compounds according to the invention as compared to corresponding oxidizable compounds is that they must take up electrons, i.e. undergo reduction, before the photographically useful compound can be released. The compounds according to the invention are comparatively stable in various liquid media, for example in alkaline media. The various known compounds, by contrast, must be oxidized before the mechanism to release a compound can take place or else release of a compound is dependent upon hydrolysis taking place as a function of the pH instead of as a consequence of reduction.

In comparison to corresponding known reducible compounds the compounds of the present invention provide the advantage that within the chain of reactions that precedes the release of the photographically useful compound a further partial reaction is available in addition to the reduction of E. Thus further partial reaction may be the hydrolytic clearage of the groups $—XR^2$ (when $R^2$ represents acyl) with formation of the corresponding group —XH or $—X^{\ominus}$. As such additional partial reaction necessarily must be completed before the photographically useful compound can be released, this contributes to a low degree of fog.

The compounds according to the invention are advantageously reacted with an electron donor compound (ED compound) which reduces the residue E to form a group which increases the reactivity of group $XR^2$ with $GR^1$ to such an extent compared with that of the starting compound according to the invention that $R^1$ is released. The ED compound may be delivered to the compound by, for example, spraying, using a stencil, by physical transfer, by suction or by imagewise transfer.

The compounds according to the invention are used in combination with a suitable ED compound in photographic layers in order to release the diffusible photographically active compound imagewise by reductive splitting. The ED compound is oxidized and thereby inactivated imagewise in the exposed areas before it can react with the compound according to the invention. It is in this way that image reversal is achieved by reductive splitting of the compound according to the invention.

An ED compound is generally understood to mean one which is capable of reducing the compounds according to the invention which are thereby activated to release the photographically useful compound. Suitable ED compounds are described e.g. in U.S. Pat. No. 4,139,379 and in German Patent Application P 29 47 425.7 (and corresponding U.S. patent application Ser. No. 208,187; filed Nov. 19, 1980).

According to a particularly preferred embodiment, so called ED precursor compounds are used as Ed compounds. These precursors are generally compounds in which the reductively active function required for the reductive splitting of the compounds according to the invention is present in a chemically masked form. It is only at certain pH values that the ED percursor compounds are converted into ED compounds which alone are capable of reacting with the compound according to the invention. This further differentiates the reactions in time and hence improves the possibility of controlling the whole mechanism. Suitable ED precursor compounds are described in German Patent Application P 30 06 268.1.

The ED compounds and ED precursor compounds are preferably introduced into the photographic material in such a manner or the photographic material is constructed in such a manner that these compounds become active only for the production of the required partial color image. A photographic material designed to produce color images in colors true to life generally contains three layer units for producing the three partial color images, namely a layer unit containing a blue sensitive silver halide emulsion layer and substances for producing the yellow partial color image, a layer unit containing a green sensitive silver halide emulsion layer and substances for producing the magenta partial color image and a layer unit containing a red sensitive silver halide emulsion layer and substances for producing the cyan partial color image. The ED compounds and ED precursor compounds are used in such a manner that they become active only in the layer unit with which they are associated. This may be achieved by, for example, separating the layer units in question by intermediate layers containing compounds for capturing the ED compounds or ED precursor compounds. Another possibility of restricting the action of the ED compounds or ED precursor compounds to the required layer unit consists of incorporating these compounds in a diffusion fast form. This is achieved by the usual means, e.g. by providing these compounds with ballast groups, generally long chain alkyl groups, or by incorporating them in a hetero disperse form, for example dissolved in so-called oil formers. The technique required for this is known from the method of introducing color couplers into conventional color photographic materials.

On development, the ED compound used originally or formed under alkaline condition when an ED precursor compound is used, reacts immediately with the oxidized photographic developer and thereby looses its capacity to reductively split the compound according to the invention. Simultaneously, the oxidized developer compound, is reduced and becomes available for the development of a further quantity of exposed silver halide.

In the unexposed areas, on the other hand, no oxidized photographic developer is available. Therefore, the ED compound which may be formed by hydrolysis from the ED precursor compounds when such precursors are used, reacts instantly with the compound according to the invention and initiates reductive splitting thereof to release the diffusible photographically active compound, which is advantageously an image dye.

The ED compound or ED precursor compound on the one hand and the compound according to the invention on the other hand may be incorporated in separate solutions although it is advantageous in many cases to incorporate the ED compounds or ED precursor compound together with the compound according to the invention so that the droplets of oil former contain both these reactants.

Since the reductive splitting reaction again proceeds at a certain velocity which depends on the nature of the reactants, it is possible by suitable choice of the ED compound and compound according to the invention, which constitute the reactants, to control the formation of the diffusible photographically active compound and thereby obtain optimum results. The concentration of ED compounds and ED precursor compounds in the layer units of the photographic material may vary within wide limits. It has generally been found suitable to use a concentration of ED compound or Ed precursor compound and a concentration of compound according to the invention in proportions lying within the range of 1:2 to 2:1, preferably from 1:1 to 2:1.

The following are examples of suitable ED compounds and ED precursor compounds:

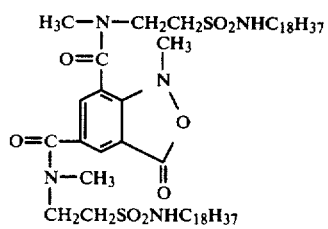
ED 1

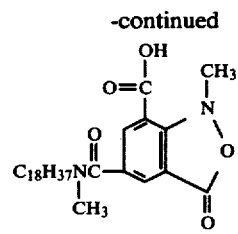
ED 2

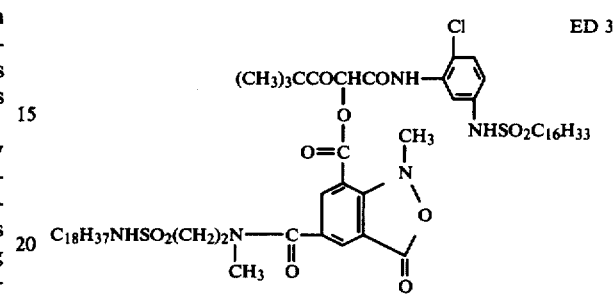
ED 3

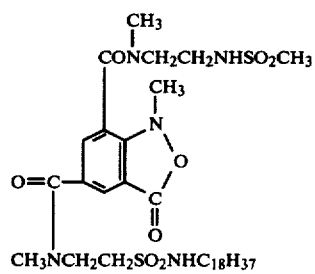
ED 4

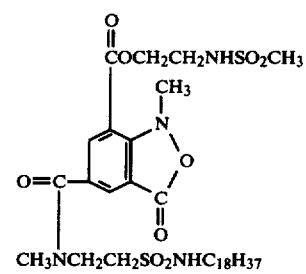
ED 5

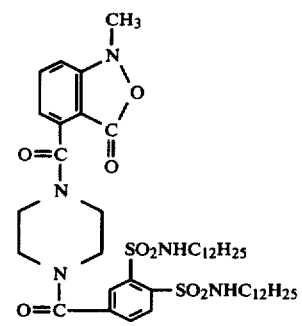
ED 6

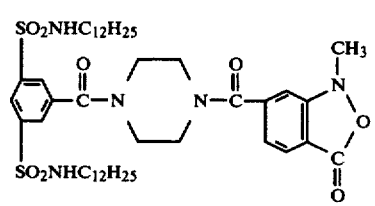
ED 7

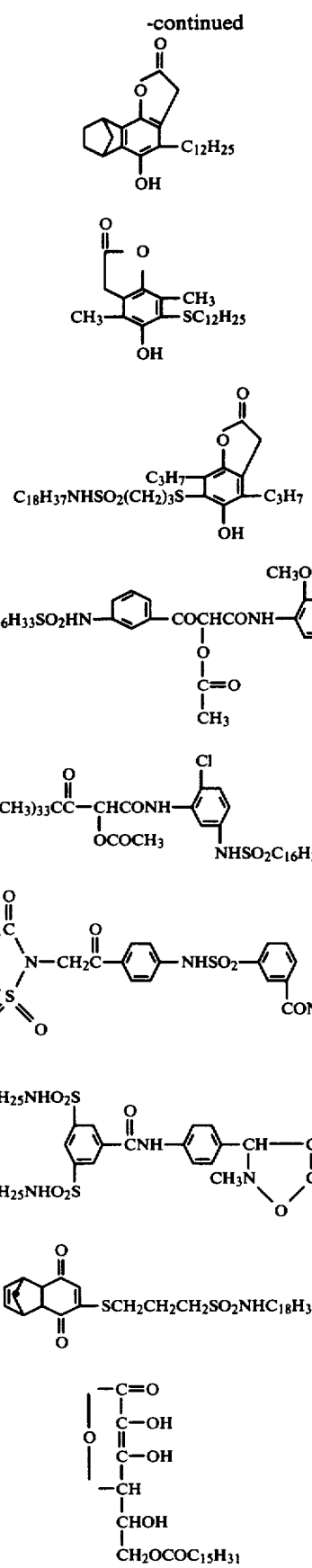

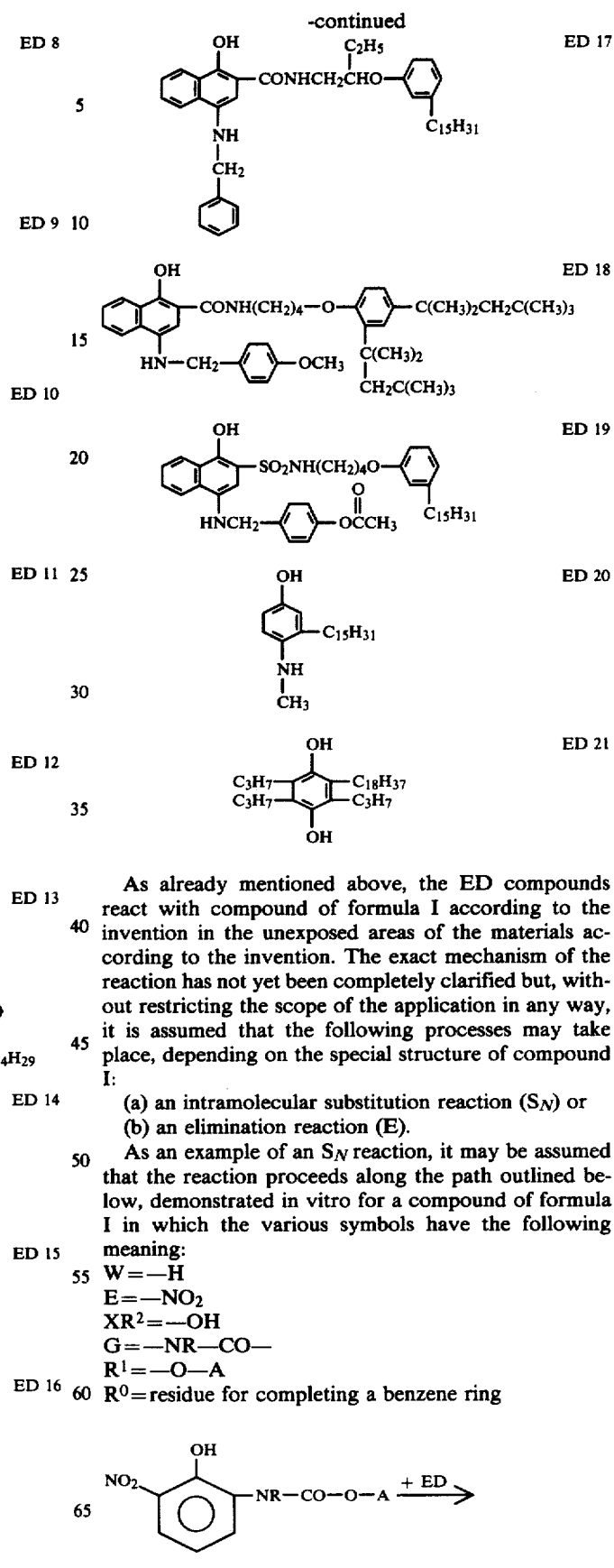

As already mentioned above, the ED compounds react with compound of formula I according to the invention in the unexposed areas of the materials according to the invention. The exact mechanism of the reaction has not yet been completely clarified but, without restricting the scope of the application in any way, it is assumed that the following processes may take place, depending on the special structure of compound I:

(a) an intramolecular substitution reaction ($S_N$) or
(b) an elimination reaction (E).

As an example of an $S_N$ reaction, it may be assumed that the reaction proceeds along the path outlined below, demonstrated in vitro for a compound of formula I in which the various symbols have the following meaning:

W = —H
E = —NO$_2$
XR$^2$ = —OH
G = —NR—CO—
R$^1$ = —O—A
R$^0$ = residue for completing a benzene ring

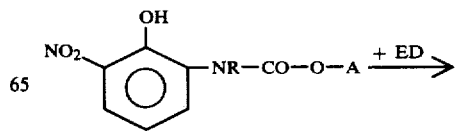

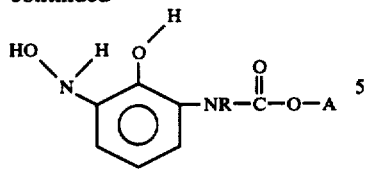

After reduction of the electron attracting NO₂ group, the compound may be split up, optionally with the formation of an intermediate stage:

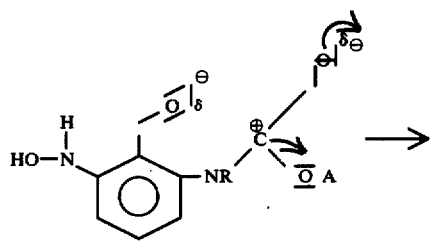

to form:

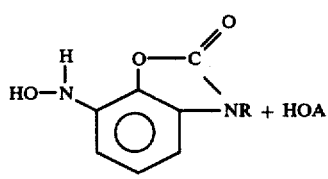

As an example of an E reaction, the following reaction path may be assumed, demonstrated in vitro for a compound of formula I which does not correspond to the invention and in which the symbols have the following meaning:
R⁰=residue for completing a benzene ring
E=—NO₂
W=—H
XR²=—OH

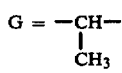

R¹=—SO₂—A

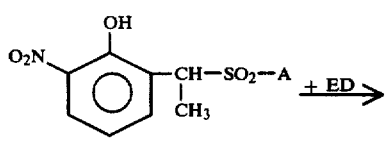

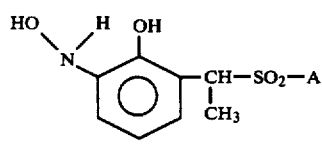

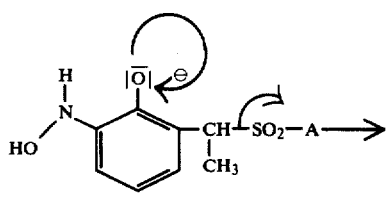

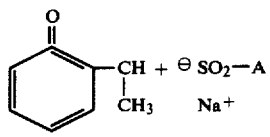

The non-diffusing reducible color providing compounds according to the invention are incorporated in the casting solutions for the layers of the photographic material by any of the usual methods. The quantity of color providing compound used per liter of casting solution varies within relatively wide limits, and the most suitable concentration can be determined by simple tests. The quantity of color providing compound used may be, for example, from 5 to 80 g, preferably from 20 to 40 g per liter of casting solution.

The association between non-diffusing reducible compound and silver halide required to produce the desired effect may be obtained by, for example, introducing the compounds of the invention into the casting solutions from aqueous solution, making use of strongly acid water solubilizing groups present. The non-diffusing reducible compounds may, however, also be introduced into the layers by any of the known emulsification methods. Such methods have been described in, for example, British Patent Nos. 791,219 and 1,099,414 to 1,099,417. Aqueous dispersions of the reducible compounds may also be prepared and added to the casting solutions. For this purpose, aqueous slurries of the reducible compound are finely milled, for example by vigorous stirring with the addition of sharp edged sand or by using ultrasound. In another embodiment, it may be desirable, for example, to incorporate the reducible compounds into the layer in the form of so-called micro capsules together with silver halide and optionally also developer substances. In that case, two or more differently sensitized light-sensitive silver halide emulsions and the appropriate diffusion fast compounds may be combined in a single layer in the form of so-called mixed grain emulsions as described in, for example, U.S. Pat. No. 2,698,794. The non-diffusing reducible compounds may be accommodated in a light-sensitive layer or in an adjacent layer. When the compounds of the invention are color providing compounds a compound which splits off a cyan dye, for example, is associated with the red sensitive layer, a compound which splits off a magenta dye with the green sensitive layer and a compound splitting off a yellow dye with the blue sensitive layer.

By "association" and "associated" is meant that the silver halide emulsions, ED compound or ED precursor compound and color providing compound are arranged in relation to each other so that they are capable of interacting to ensure imagewise correspondence between the silver image formed and consumption of ED compound on the one hand and between the unused ED compound and the color providing compound on the other hand so that there is a resulting correspondence between the undeveloped silver halide and the imagewise distribution of diffusible dye. The light-sensitive silver halide and the combination of color providing compound and ED compound need not necessarily be present in the same layer in order to achieve this. They may be accommodated in adjacent layers both belonging to the same layer unit.

Compounds according to the invention containing diffusible photographically active residues other than residues which form image dyes are added to the photographic materials in a similar manner to that used for the color providing compounds according to the invention, i.e. according to the nature of the photographically active compound in the light-sensitive silver halide emulsion layer or in layers adjacent thereto. The concentrations employed are preferably within the range of from 0.01 to 10 g/m$^2$, depending on the function and the desired effect. In cases where the photographically active diffusible compounds are development inhibitors or stabilizers, the compounds according to the invention are employed in the photographic material in such a manner that they can act in contact with the silver halide emulsions. The development inhibitor or stabilizer is then obtained in imagewise distribution in the unexposed areas. As a result of this, the formation of developed silver in the unexposed or only slightly exposed regions of the layer is effectively suppressed. Since the formation of developed silver suppresses the formation of dyes by inactivation of the ED compounds or ED precursor compounds, the simultaneous use of development inhibitor releasing compounds according to the invention and of color providing compounds according to the invention favours the formation of dye in the unexposed areas and thereby increases the density of the image dye.

The developer compounds essentially have the function of developing the imagewise exposed silver-halide, i.e. to reduce the silver halide in those regions of the photographic layer which have been exposed to light. Simultaneously the ED compound is oxidized in correspondence with the imagewise exposed silver halide and thereby rendered incapable of reacting with the non-diffusing reducible compounds of the present invention.

The usual photographic developers are generally suitable for use as developer or auxiliary developer compounds, e.g. hydroquinone or derivatives thereof such as 2,5-dichlorohydroquinone and 2-chlorohydroquinone; aminophenol compounds such as 4-aminophenol, N-methylaminophenol, 3-methyl-4-aminophenol or 3,5-dibromoaminophenol; pyrocatechol or derivatives thereof such as 4-cyclohexyl pyrocatechol, 3-methoxy pyrocatechol and 4-(N-octadecylamino) pyrocatechol; and phenylene diamine developers such as N,N-diethyl-p-phenylene diamine, 3-methyl-N,N-diethyl-p-phenylene diamine, 3-methoxy-N-ethyl-N-hydroxyethyl-N,N-diethyl-p-phenylene diamine, 3-methoxy-N-ethyl-N-hydroxyethyl-p-phenylene diamine or N,N,N',N'-tetramethyl-p-phenylene diamine.

Preferred however are the photographic developers of the 3-pyrazolidone series, e.g. 1-phenyl-3-pyrazolidone, 1-phenyl-4,4-dimethyl-3-pyrazolidone, 4-hydroxymethyl-4-methyl-1-phenyl-3-pyrazolidone, 1-phenyl-4-methyl-3-pyrazolidone, 1-phenyl-5-methyl-3-pyrazolidone, 1-phenyl-4,4-bis-(hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazolidone, 1-4(4-chlorophenyl)-4-methyl-3-pyrazolidone, 1-(3-chlorophenyl)-3-pyrazolidone, 1-(4-chlorophenyl)-3-pyrazolidone, 1-(4-tolyl)-4-methyl-3-pyrazolidone, 1-(3-tolyl)-4,4-dimethyl-3-pyrazolidone, 1-(2-trifluoroethyl)-4,4-dimethyl-3-pyrazolidone and 5-methyl-3-pyrazolidone.

The usual routine tests can easily determine which developers act optimally for any particular system. Combinations of several developer compounds may, of course, also be used.

The photographic developers may be introduced by various means into the reaction mechanism taking place in the photographic material. They may, for example, be added to the developer liquid or paste and used with it in the usual manner or they may be added partly or completely to one or more layers of the photographic material, e.g. one or more of the light-sensitive silver halide emulsion layers, auxiliary layers, intermediate layers or image receiving layers.

Since the imagewise distribution of the diffusible dye released during the development process corresponds to the imagewise distribution of the undeveloped silver halide, the production of a positive colored transfer image does not require the use of direct positive silver halide emulsions nor the use of a suitable reversal process but can be achieved by the use of ordinary negative emulsions. These may be chemically or spectrally sensitized in known manner and may contain the usual emulsion or coating additives such as stabilizers, hardeners, wetting agents, oil formers and others.

The dye diffusion transfer process according to the present invention is carried out using a light-sensitive element containing one or more silver halide emulsion layers and non-diffusing color providing compounds associated therewith and an image receiving element in which the desired color image is produced by the diffusible dyes which have been transferred imagewise. To achieve this transfer, firm contact must be established for at least a finite period of time within the development time between the light-sensitive element and the image receiving element so that the imagewise distribution of diffusible dyes produced in the light-sensitive element as a result of development can be transferred to the image receiving element. Contact may be established either after or even before development has started.

If, for example, the dye diffusion transfer process is carried out using a material in which the light-sensitive element and the image receiving element form an integral unit, hereinafter referred to as a monosheet material, which remains intact even after completion of the development process i.e. the light-sensitive element is not separated from the image receiving element even after the dye has been transferred, then this contact is established even before development begins. Such an embodiment has been described in, for example, German Offenlegungsschrift No. 2,019,430.

A monosheet material suitable for carrying out the dye diffusion transfer process according to the present invention may comprise, for example, the following layer elements:
(1) a transparent support layer
(2) an image receiving layer
(3) a light impervious layer
(4) a light-sensitive layer comprising at least one light-sensitive silver halide emulsion layer and at least one non-diffusing color providing compound associated therewith
(5) a retarding layer
(6) an acid polymer layer and
(7) a transparent support layer.

The monosheet material may be obtained by producing two different parts separately from each other, namely the light-sensitive part (layer elements 1 to 4) and the cover sheet (layer elements 5 to 7), which are then placed face to face and joined together, optionally using spacer strips to form space for an accurately measured quantity of processing liquid between the two parts. The layer elements 5 and 6 which together form the neutralization system may additionally or alternatively be arranged between the support layer and the image receiving layer of the light-sensitive part, although in reversed sequence.

Means may be provided for introducing a processing liquid between the light-sensitive part and the cover sheet, e.g. in the form of a container which is placed laterally and is split open by mechanical forces to release its contents between two adjacent layers of the monosheet material.

An essential part of the photographic recording material according to the present invention is the light-sensitive element which in the case of a monochrome transfer process contains a light-sensitive silver halide emulsion layer and a non-diffusing color providing compound associated therewith. The non-diffusing compound may be contained in a layer adjacent to the silver halide emulsion layer itself. In the latter case, the color of the image dye is preferably chosen so that the predominant absorption range of the color providing compound does not coincide with the predominant sensitivity range of the silver halide emulsion layer.

For producing multicolored transfer images in true to life colors, the light-sensitive element contains three such associations of color providing compound with light-sensitive silver halide emulusion layer, the absorption range of the color providing compound in general substantially corresponding to the spectral sensitivity range of the associated silver halide emulsion layer. It is, however, of advantage for obtaining high sensitivity that the color producing combination should be arranged in a separate layer of binder behind the silver halide emulsion layer (viewed in the direction of the incident light used for exposure).

The developer oxidation products produced on development of a silver halide emulsion must, of course, be confined in their action to the associated color providing compound. Separating layers are therefore generally provided in the light-sensitive element to prevent diffusion of the developer oxidation products to other layers with which they are not associated.

These separating layers may, for example, contain suitable substances which react with the developer oxidation products, e.g. non-diffusible hydroquinone derivatives or, if the developer is a color developer substance, a non-diffusible color coupler. In a preferred embodiment, therefore, the light-sensitive element has the following structure (from above downwards):

blue sensitive silver halide emulsion layer;
layer containing non-diffusing compound releasing a diffusible yellow dye;
separating layer;
green sensitized silver halide emulsion layer;
layer containing non-diffusing compound releasing a diffusible magenta dye;
separating layer;
red sensitized silver halide emulsion layer;
layer containing non-diffusing compound releasing a diffusible cyan dye.

The silver halide emulsion layers may, of course, also be arranged in a different sequence but the order of the associated layers containing the color providing systems must then also be changed so that the association is preserved.

The light impervious layer arranged under the light-sensitive element is permeable to aqueous alkaline treatment solutions and hence to the diffusible dyes. It has two principle functions; Firstly, it serves to cover the image silver left in the original light-sensitive element after development and the color providing compounds left behind as color negative, so that when material is viewed through the transparent support layer of the light-sensitive part, onle the positive color transfer image is visible. Secondly, it provides a light-proofing covering for the light-sensitive element on the side of the image receiving layer (at the bottom). The second function is particularly important if the monosheet material is brought into contact with the alkaline processing mass while still inside the camera after exposure and is then removed to be developed outside the camera.

Layers which are sufficiently impervious to light and yet sufficiently permeable to diffusible dyes may be prepared in known manner from, for example, suspensions of inorganic or organic pigments, e.g. suspensions of carbon black and/or $TiO_2$ in suitable binders such as in gelatinge solutions. Instead of providing a light impervious layer, means for producing such a layer may be arranged between the light-sensitive element and the image receiving layer, e.g. in the form of a container placed at the side, filled with a processing liquid containing a clouding agent (pigment) which is poured out between the aforesaid layers when mechanical forces are applied to the container so that such a pigment layer is formed between these layers.

The image receiving layer consists substantially of a binder containing dye mordants for fixing the diffusing dyes, e.g. non-diffusing monomeric or polymeric compounds containing quaternary ammonium groups.

The transparent support layers used for the monosheet material according to the invention may be any of the usual materials of this type in photography, e.g. films of cellulose esters, polyethylene terephthalate, polycarbonate or other film forming polymers.

Neutralization systems, i.e. combinations of an acid polymer layer and a retarding layer, have been described, for example, in German Patent No. 1,285,310. Such layer combinations may be provided in the material according to the invention, for example in the light-sensitive part between the transparent support layer and the image receiving layer. The purpose of these layer combinations is to maintain for a certain time the comparably high pH-value which has been established in the recording material by distribution of the alkaline processing liquid, and thereafter to lower the pH-value as rapidly as possible by neutralization with the acid polymer layer when the retarding layer has performed its retarding function. The neutralization system of acid polymer layer and retarding layer may also be arranged on the cover sheet. These two layers must, of course, be arranged in such a sequence that the alkali of the processing liquid must first penetrate the retarding layer before it can reach the acid polymer layer.

The dye diffusion transfer process according to the invention may advantageously be carried out in or by means of a suitable self-developer camera. This may, for example, be provided with devices for distributing a processing liquid between the light-sensitive element and the cover sheet after exposure of the light-sensitive element and covering the light-sensitive material at the top to make it impervious to light. Such a camera is advantageously provided with two squeezing rollers placed opposite each other, between which the monosheet material is pulled out while the container arranged at the side is split open to release its contents between the layers of the monosheet material.

When the light-sensitive element is shielded against unwanted exposure by light-impervious layers on both sides once it has passed between the squeezing rollers, the exposed material may be pulled out of the camera immediately after development has started.

To process the monosheet material after it has been exposed imagewise, the light-sensitive element is brought into contact with the aqueous alkaline processing liquid so that the silver halide emulsion layers, which have been exposed imagewise, are developed in the presence of a developer compound, and oxidation products of the developer compound are produced in imagewise distribution corresponding to the silver image formed, and the associated ED compound is thereby oxidized and rendered incapable of reaction with the reducible compound. The imagewise distribution of ED compound which has not been oxidized reduces the reducible compound of the present invention which is thereupon split under the action of the activator or developer alkali to release the diffusible dye.

The aqueous alkaline processing solution may contain viscosity increasing additives, e.g. hydroxy ethyl cellulose. It may also contain the usual development accelerators, silver salt solvents, fogging agents, antioxidents and other additives.

The invention has been described above with reference to examples in which the photographically active group is a diffusible dye or dye precursor, but other embodiments are also conceivable, in which the photographically active compound may be, for example, an antifogging agent, a development inhibitor, a hardener, a developing agent or a development accelerator. In all of these cases, the photographically active compound is released imagewise, i.e. in correspondence with the imagewise distribution of undeveloped silver halide if negative emulsions are used. This gives rise to numerous possibilities of producing images.

WORKING EXAMPLE 1

A mordant layer, a light reflective layer and a light-sensitive silver halide layer were applied in that order to a transparent support layer of cellulose triacetate.

MORDANT LAYER 3.75 g of a copolymer of 1 part of styrene and 1 part of maleic acid imide of N,N-dimethyl-N-hexadecyl-N-ω-aminopropyl-ammonium bromide were dissolved in 15 ml of ethanol and the solution was stirred into 75 ml of a 5% gelatine solution and homogenized. After the addition of 2.6 ml of a 5% saponin solution and 1 ml of an aqueous 2% mucochloric acid solution, the resulting solution was adjusted to the usual casting viscosity of about 11 mPa.s and applied to the support by the immersion process at 40° C. (casting velocity 5 m/min).

LIGHT REFLECTIVE LAYER

A slurry of 42 g of $TiO_2$ in 20 ml of water was dispersed in 150 ml of an aqueous 8% gelatine solution with the addition of 5 ml of an aqueous 5% solution of sodium dodecyl benzene sulfonate and 5 ml of an aqueous 5% saponin solution. After the addition of 1 ml of a 2% mucochloric acid solution, the dispersion was adjusted to a viscosity of 13 mPa.s at 40° C. and applied to the dried mordant layer by the immersion process (casting velocity 5 m/min).

SILVER HALIDE LAYER

The compounds of formula I entered in the following table were used in each case in a quantity of 2.5 mmol and dissolved in each case in 25 ml of ethyl acetate together with 3.75 mmol of the ED compounds and the solution was dispersed in 100 ml of a 5% gelatine solution with the addition of 5 ml of lauric acid diethylamide. After the further addition of 100 ml of 5% gelatine and 3 ml of 2% mucochloric acid solution, each of the dispersions was mixed with 50 g of a silver halide emulsion which was ready for casting. This silver halide emulsion had been prepared from 74 g $AgNO_3$ per kg of emulsion. It had an Ag/gelatine ratio of 1:1.1 and the halide was mainly bromide with 0.67 mol% of iodide. The mixtures were applied to the dried light reflective layer by the immersion process at 40° C. at a speed of 5 m/min.

After drying, the various samples were exposed on the emulsion side through a grey-step filter, developed for 1 minute and 4 minutes, respectively, at 20° C. in the developer described below, and washed and dried.

DEVELOPER 1.5 g of the sodium salt of ethylene diaminotetraacetic acid
1.0 g of sodium hexametaphosphate
2.0 g of 1-phenyl pyrazolidine
3.0 g of potassium bromide
made up to 1,000 ml with water and adjusted to pH 13.6 with 2 N NaOH.

Completely developed positive color wedges which were visible through the transparent support layer were obtained from each of the samples. The color densities (Dmin and Dmax) were measured behind color filters, using a reflection densitometer, and their values are summarized in the following table.

TABLE

| Sample | Compound I according to the invention | ED compound | Development time (min) | $D_{min}$ | $D_{max}$ |
|---|---|---|---|---|---|
| 1 | 2.1 | ED 1 | 1 | 0.12 | 0.98 |
| 2 | 2.1 | ED 1 | 4 | 0.16 | 1.23 |
| 3 | 2.1 | ED 21 | 1 | 0.10 | 0.87 |
| 4 | 2.1 | ED 21 | 4 | 0.13 | 0.98 |
| 5 | 2.3 | ED 1 | 1 | 0.22 | 1.22 |
| 6 | 2.3 | ED 1 | 4 | 0.29 | 1.29 |
| 7 | 2.7 | ED 1 | 1 | 0.19 | 1.05 |
| 8 | 2.7 | ED 1 | 4 | 0.23 | 1.15 |
| 9 | 2.2 | ED 20 | 1 | 0.12 | 0.79 |
| 10 | 2.2 | ED 20 | 4 | 0.16 | 0.89 |
| 11 | 2.4 | ED 1 | 1 | 0.33 | 1.27 |
| 12 | 2.4 | ED 1 | 4 | 0.35 | 1.52 |

EXAMPLE 2

The contents of a bag as conventionally used for the diffusion transfer process were applied to the exposed material obtainable from example 1. The liquid released from the bag contained the following reactants in the given quantities based on 1 liter of aqueous solution:
1.5 g of ethylene diaminotetraacetic acid
1 g of sodium metaphosphate
4 g of potassium bromide 2 g of 4-hydroxymethyl-4-methyl-1-phenyl-3-pyrazolidone
0.1 g of mercaptophenyl tetrazole
50 g of sodium hydroxide solution
30 g of carboxy methyl cellulose
5 ml of benzyl alcohol.

The action of the alkaline paste was brought to a standstill after 1 minute and 4 minutes respectively.

Positive, clearly stepped dye images with image whites and maximum densities comparable to the values obtained in example 1 were found in the image receiving layers.

We claim:

1. Photographic recording material having at least one light-sensitive silver halide emulsion layer and in association with said silver halide emulsion layer, a non-diffusing reducible compound which can be split to release a diffusible photographically useful compound, the non-diffusing reducible compound corresponding to the following formula I

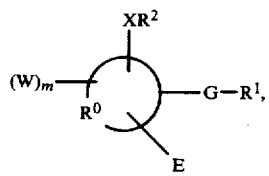

in which the substituents W, $XR^2$, $G—R^1$ and E may be arranged in any positions in relation to each other and in which:

$R^0$ represents the atoms required to complete a ring system comprising at least one aromatic or heteroaromatic ring;

W represents a group which reduces the electron density in the ring at the position of E and is selected from the group consisting of a halogen atom, a cyano group, a nitro group, a nitroso group, a trifluoromethyl group, a quaternary ammonium group and an acyl group;

m represents an integer of from 1 to 3;

G represents a group from which $R^1$ can be split off under photographic development conditions;

$R^1$ represents the residue of a diffusible photographically active compound;

X represents an oxygen atom, a sulfur atom or the group $—NR^3—$;

$R^2$ represents hydrogen or a group which can be split off in alkaline medium, and E represents a reducible substituent selected from the group consisting of

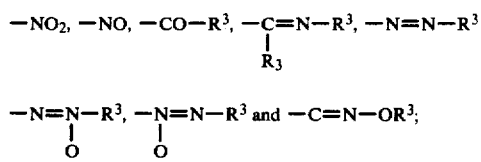

$R^3$ represents hydrogen, alkyl, aryl, a heterocyclic group or aralkyl, and the compound of formula I contains at least one substituent conferring diffusion resistance.

2. Photographic recording material as claimed in claim 1 in which in formula I
$R^0$ represents the atoms required to complete a benzene ring;
E is in position ortho or para to the group $—XR^2$;
W is in position ortho or para to the substituent E.

3. Photographic recording material as claimed in claim 1, in which in formula I
$R^0$ represents the atoms required to complete a benzene ring,
W represents a halogen atom, an alkyl sulfonyl group or a nitro group in position ortho or para to the substituent E;
m represents an integer of from 1 to 3;
X represents $—O—$;
$R^2$ represents an acyl group;
E represents a nitro group in position ortho or para to the group $—XR^2$.

4. Photographic material according to claim 1, characterized in that the photographically active residue is a dye or a dye precursor.

5. Photographic recording material as claimed in claim 1, in which the silver halide emulsion layer contains a negatively operating silver halide emulsion.

6. Photographic recording material as claimed in claim 1 containing an electron donor compound or electron donor precursor compound in effective contact with the compound of formula I.

7. Photographic recording material as claimed in claim 1 in the form of an integral color instant image unit comprising in the following order at least:
(a) a light sensitive element containing at least one negatively functioning silver halide emulsion layer and in association with said silver halide emulsion layer a combination of a non-diffusing reducible compound of formula I in which $R^1$ represents the residue of a diffusible dye or dye precursor, and an ED compound or ED precursor compound;
(b) an alkali permeable, light reflecting opaque layer; and
(c) an image receiving layer for reception of the diffusible dye or dye precursor released from the reducible compound of formula I.

* * * * *